United States Patent
Hirade et al.

(10) Patent No.: US 10,846,547 B2
(45) Date of Patent: Nov. 24, 2020

(54) DATA CORRECTION METHOD, COMPUTER PROGRAM FOR CAUSING COMPUTER TO PERFORM DATA CORRECTION METHOD, IMAGE PROCESSOR, AND SCANNING PROBE MICROSCOPE

(71) Applicant: Shimadzu Corporation, Kyoto (JP)

(72) Inventors: Masato Hirade, Kyoto (JP); Kenji Yamasaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 75 days.

(21) Appl. No.: 16/239,905

(22) Filed: Jan. 4, 2019

(65) Prior Publication Data
US 2019/0294905 A1  Sep. 26, 2019

(30) Foreign Application Priority Data

Mar. 20, 2018 (JP) ................. 2018-053072

(51) Int. Cl.
| | | |
|---|---|---|
| *G06K 9/03* | (2006.01) | |
| *G06K 9/46* | (2006.01) | |
| *G06K 9/20* | (2006.01) | |
| *G06T 5/50* | (2006.01) | |
| *G06T 7/11* | (2017.01) | |

(52) U.S. Cl.
CPC ............ *G06K 9/03* (2013.01); *G06K 9/2054* (2013.01); *G06K 9/4604* (2013.01); *G06T 5/50* (2013.01);
(Continued)

(58) Field of Classification Search
CPC ...... G06K 9/03; G06K 9/4604; G06K 9/2054; G06K 9/4661; G06T 5/50; G06T 7/11;
(Continued)

(56) References Cited

U.S. PATENT DOCUMENTS

| | | | | |
|---|---|---|---|---|
| 6,710,339 | B2* | 3/2004 | Egawa | B82Y 35/00 850/1 |
| 2007/0067140 | A1* | 3/2007 | Jain | G03F 7/70625 702/172 |

(Continued)

FOREIGN PATENT DOCUMENTS

| | | | |
|---|---|---|---|
| JP | H04-215005 A | | 8/1992 |
| JP | H06-147821 | * | 5/1994 |

(Continued)

OTHER PUBLICATIONS

Machine translation for JP H06-147821 (Year: 1994).*

(Continued)

*Primary Examiner* — Qian Yang
(74) *Attorney, Agent, or Firm* — Maier & Maier, PLLC (57) ABSTRACT

A data correction method for allowing any observer to satisfactorily perform height correction on an image is provided. Specifically, a data correction method for correcting height of a plurality of pieces of measurement data by using image data acquired by a scanning probe microscope is disclosed. In this data correction method, a computer extracts a reference plane region from the image data, selects three pieces of measurement data, from the pieces of measurement data, at three points in the extracted reference plane region as first to third reference point data, and performs height correction on the other pieces of measurement data on the assumption that the first to third reference point data have the same height.

17 Claims, 7 Drawing Sheets

(52) U.S. Cl.
CPC ...... *G06T 7/11* (2017.01); *G06T 2207/10056* (2013.01); *G06T 2207/20021* (2013.01); *G06T 2207/20224* (2013.01)

(58) Field of Classification Search
CPC . G06T 2207/20224; G06T 2207/10056; G06T 2207/20021; G06T 5/007; G01Q 40/00; G01Q 60/26; G01Q 60/10
See application file for complete search history.

(56) References Cited

U.S. PATENT DOCUMENTS

| | | | | |
|---|---|---|---|---|
| 2009/0032706 A1* | 2/2009 | Prater | ............... | G01Q 20/02 250/307 |
| 2012/0070039 A1* | 3/2012 | Morimoto | ............. | G01Q 30/04 382/108 |

FOREIGN PATENT DOCUMENTS

| JP | H06-331633 A | 12/1994 |
|---|---|---|
| JP | H11-326347 A | 11/1999 |
| JP | 2000-180339 A | 6/2000 |

OTHER PUBLICATIONS

Fink, "Mono-atomic tips for scanning tunneling microscopy", IBM journal of research and development (Year: 1986).*
Japanese Office Action dated Aug. 20, 2019, in connection with corresponding JP Application No. 2018-053072 (7 pgs., including machine-generated English translation).

* cited by examiner

DATA CORRECTION METHOD, COMPUTER PROGRAM FOR CAUSING COMPUTER TO PERFORM DATA CORRECTION METHOD, IMAGE PROCESSOR, AND SCANNING PROBE MICROSCOPE

CROSS-REFERENCE TO RELATED APPLICATION

This application claims priority to Japanese Patent Application No. 2018-053072 filed on Mar. 20, 2018, the entire disclosure of which is incorporated by reference herein.

FIELD

The present disclosure relates to a data correction method for correcting an image acquired by a scanning probe microscope (SPM) used to observe three-dimensional properties of a sample surface.

BACKGROUND

Scanning probe microscopes (SPMs) are instruments for observing unevenness of a target sample surface at high resolution. Specifically, this observation is performed by horizontally scanning the target sample surface with a probe having a sharp tip in close proximity to the target sample surface, while moving the probe closer to or further from the surface to keep a constant physical interaction between the tip of the probe and the sample surface. SPMs collectively refer to microscopes that observe the unevenness of sample surfaces in accordance with the principle above. Examples of widely used SPMs include a scanning tunneling microscope (STM) configured to detect current flowing between the probe and the sample as interactions, and an atomic force microscope (AFM) configured to detect atomic force between the probe and the sample as interactions.

A scanning probe microscope can scan a sample surface at a high solution in the height direction, but it is difficult for the scanning probe microscope to horizontally place the sample surface at the same level of solution.

In this regard, it is a typical procedure to correct a height image (hereinafter referred to as an SPM image) acquired by the scanning probe microscope to correct an inclined plane to a horizontal plane. Japanese Unexamined Patent Publication No. H06-331633 discloses a technique relating to such height correction.

The height correction method for correcting an SPM image disclosed in Japanese Unexamined Patent Publication No. H06-331633 includes obtaining data in a third-dimensional direction corresponding to a predetermined two-dimensional region from stored three-dimensional data, calculating a virtual plane representing a sample surface by using two-dimensional coordinates of the two-dimensional region and the data in the three-dimensional direction, and correcting the inclination of the sample surface by using the virtual plane. In other words, the virtual plane is calculated on the assumption that the predetermined two-dimensional region is generally a single plane and the height correction is performed based on the virtual plane.

However, this correction method using a virtual plane calculated from an entire observation surface cannot be an ideal height correction method in observing a sample surface having structures or grooves on a flat surface, such as a surface of a precision grid or a surface having lines and spaces. In other words, height correction in this case is performed based on a virtual plane that represents an average of a flat portion and a structure portion. In addition, the height of structures or the depth of grooves may vary depending on the positions. Thus, calculating a virtual plane from the entire observation surface is inappropriate.

In another height correction method, a region defined by certain designated three points is determined to be a plane and used for height correction, but as mentioned in Japanese Unexamined Patent Publication No. H06-331633, this method requires an operator to manually designate data values during observation. This conventional method has no specific criteria for extracting a reference plane region. For this reason, height correction is performed differently by a different operator, which in turn generates a different image after the correction.

SUMMARY

It is an object of the present disclosure to provide a data correction method, a computer program, an image processor, and a scanning probe microscope for allowing any observer to satisfactorily perform height correction on an image.

In summary, the data correction method according to an aspect of the present disclosure is a method for correcting a plurality of pieces of measurement data measured by a scanning probe microscope and each indicating height of an observation target. The data correction method includes: extracting, by a computer, an edge from image data acquired by the scanning probe microscope; extracting, by the computer, a reference plane region by defining at least part of a region other than the edge in the image data as the reference plane region; and correcting, by the computer, the height of each piece of measurement data based on height information of the reference plane region.

In one preferred embodiment, the correcting includes selecting, from the pieces of measurement data, three pieces of measurement data at three points in the extracted reference plane region as first to third reference point data, and correcting the height of each piece of measurement data on an assumption that the first to third reference point data have the same height.

In one preferred embodiment, a horizontal position of each piece of measurement data is represented by an X-axis coordinate and a Y-axis coordinate, and the height of each piece of measurement data is represented by a Z-axis coordinate, the extracting the edge includes extracting an edge based on a difference between a Z-axis coordinate of a pixel of interest and a Z-axis coordinate of a pixel adjacent to the pixel of interest in an XY-plane, and the extracting the reference plane region includes dividing the XY-plane into a plurality of regions based on the extracted edge and extracting a region having a largest area of the regions as the reference plane region.

In one preferred embodiment, the correcting includes selecting, from the pieces of measurement data, four or more pieces of measurement data at four or more points in the extracted reference plane region as reference point data, and correcting the height of each piece of measurement data on an assumption that the points selected as the reference point data are in a same XY-plane.

In one preferred embodiment, the image data is data of an image formed from an error signal.

In one preferred embodiment, the correcting includes correcting a Z coordinate of first measurement data of the pieces of measurement data based on a difference, at X and Y coordinates of the first measurement data, between a Z coordinate of a plane defined by first to third reference point data and the Z coordinate of the first measurement data.

According to the present disclosure, any observer can satisfactorily perform height correction and obtain a corrected image.

DETAILED DESCRIPTION

Embodiments of the present disclosure will be described with reference to the accompanying drawings. Similar or corresponding components and parts are denoted by like reference characters, and the explanation thereof is not repeated.

First Embodiment

Figure 1:
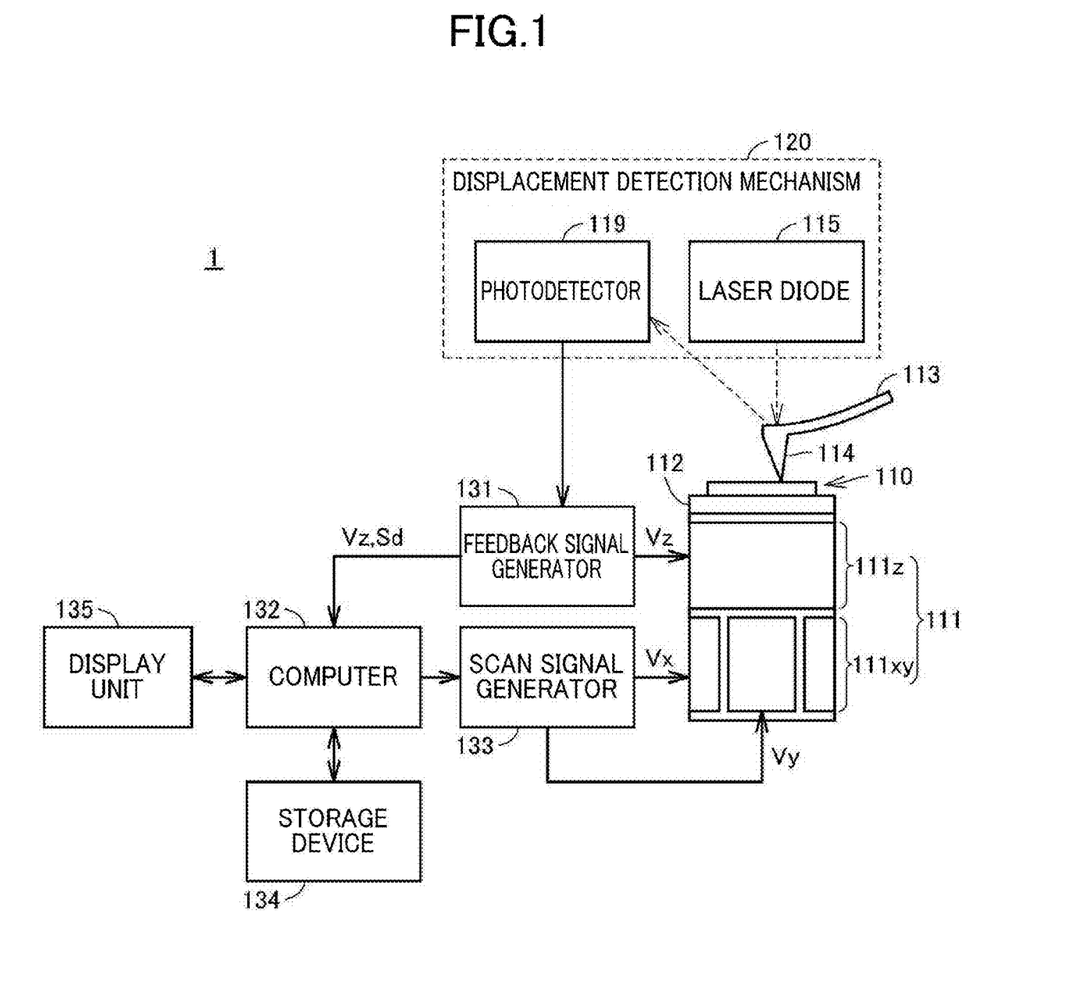
FIG. 1 is a diagram illustrating a general configuration of a scanning probe microscope according to a first embodiment of the present disclosure.

FIG. 1 is a diagram illustrating a general configuration of a scanning probe microscope according to a first embodiment of the present disclosure. The scanning probe microscope according to the first embodiment is an atomic force microscope, but the present disclosure is applicable also to other types of scanning probe microscopes such as a scanning tunneling microscope.

As illustrated in FIG. 1, this scanning probe microscope 1 includes a sample stage 112 on which a sample 110 is placed, a piezoelectric scanner 111 configured to displace the sample stage, a cantilever 113 having a probe 114 at its leading end, a displacement detection mechanism 120 configured to detect the displacement of the cantilever 113, a feedback signal generator 131, a computer 132, a scan signal generator 133, a storage device 134, and a display unit 135.

The piezoelectric scanner 111 includes a Z scanner 111z configured to displace the sample stage in a Z direction based on a voltage value Vz, and an XY scanner 111xy configured to displace the sample stage in X and Y directions based on voltage values Vx and Vy.

The displacement detection mechanism 120 includes a laser diode 115 and a photodetector 119. When the scanning probe microscope 1 is used to observe a surface of the sample 110 with the tip of the probe 114 at close proximity to the sample 110, a laser beam emitted from the laser diode 115 is reflected from the back surface of the cantilever 113 and the reflected laser beam is received by the photodetector 119. When the probe 114 is moved closer to the surface of the sample 110, the cantilever 113 warps like a plate spring, and a degree of warp is measured based on in which position the photodetector 119 receives the laser beam.

The feedback signal generator 131 receives a detection signal from the photodetector 119. The feedback signal generator 131 calculates the degree of warp of the cantilever 113 based on the detection signal. The feedback signal generator 131 regulates the position of the sample in the Z direction to keep the atomic force between the probe 114 and the surface of the sample 110 constant. The feedback signal generator 131 calculates a voltage value Vz based on the degree of warp of the cantilever 113 and outputs the value to the Z scanner 111z. The piezoelectric scanner 111 is displaced in the Z-axis direction according to the voltage value Vz.

The scan signal generator 133 calculates voltage values Vx and Vy in the X-axis direction and the Y-axis direction to move the sample 110 in the XY-plane relative to the probe 114 in accordance with a predetermined scan pattern, and outputs the values to the XY scanner 111xy.

A signal affected by the feedback (a voltage Vz applied to the scanner and an error signal Sd) in the Z-axis direction is also sent to the computer 132 and is stored in the storage device 134. The computer 132 calculates a displacement of the sample 110 from the voltage Vz based on correlation information stored in the storage device 134 in advance, the correlation information indicating a relation between a voltage Vz and a displacement of the sample 110 corresponding to the voltage Vz. The computer 132 calculates the displacements at positions in the X-axis and Y-axis directions to reproduce a three-dimensional image of the sample surface, and displays the three-dimensional image on a screen of the display unit 135. The data of the three-dimensional image is stored in the storage device 134. The data contains coordinates indicating a position on the XY-plane and a height of the sample at the coordinates. The computer 132 can read the data of the three-dimensional image stored in the storage device 134 and display it on the display unit 135 whenever necessary.

The computer 132 can correct the height of the data of the three-dimensional image when needed and display the corrected data on the display unit 135.

Figure 2:
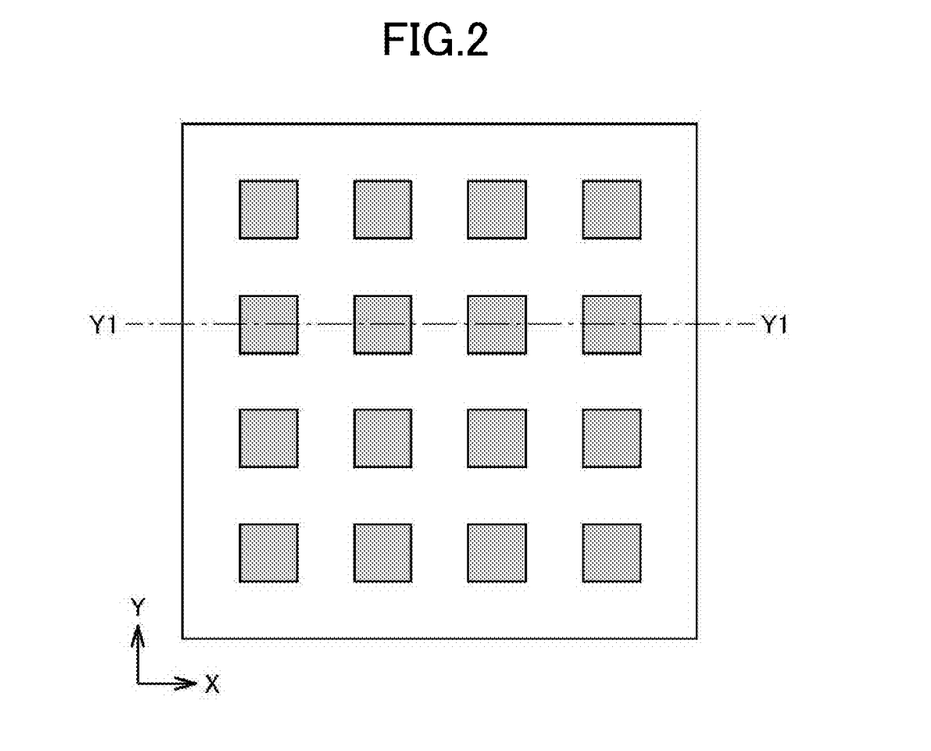
FIG. 2 is a diagram illustrating an example form of a sample to be measured by the scanning probe microscope.

FIG. 2 is a diagram illustrating an example form of a sample to be observed by the scanning probe microscope. The sample is formed with a plurality of bars arrayed in the X-axis direction and the Y-axis direction and crossing one another on a surface, forming a precision grid.

Figure 3:
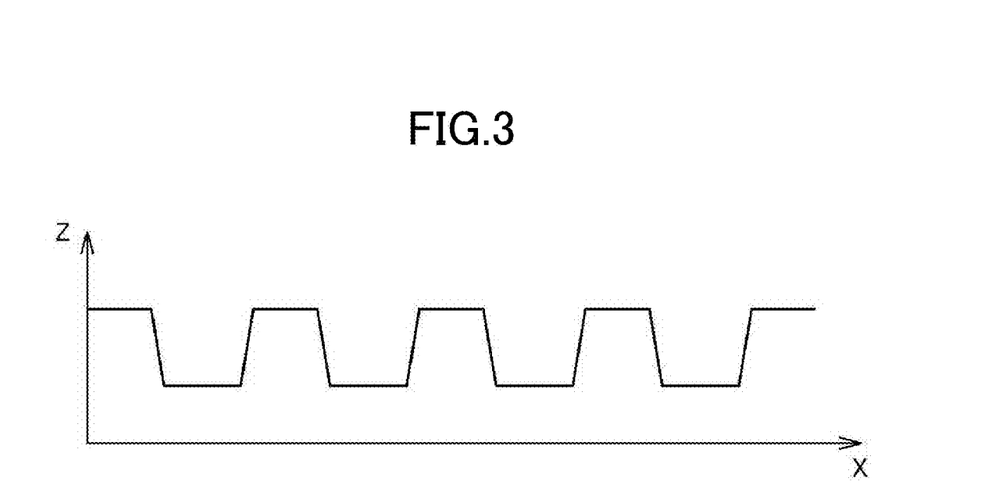
FIG. 3 is a graph illustrating height of the sample taken along line Y1-Y1 in FIG. 2.

FIG. 3 is a graph illustrating the height of the sample taken along line Y1-Y1 in FIG. 2. FIG. 3 illustrates image data of one scan line observed in an ideal state in which the sample is not inclined. In the image data in FIG. 2, borders between plane portions are indicated by solid lines, but in FIG. 3, portions corresponding to the borders are illustrated as tapered portions to represent the actual sample form as similar as possible for ease of understanding the correction process. The horizontal axis represents positions in the X direction and the Z-axis represents height at each X position. When the probe scans in the X direction, the X-axis also represents time.

Figure 4:
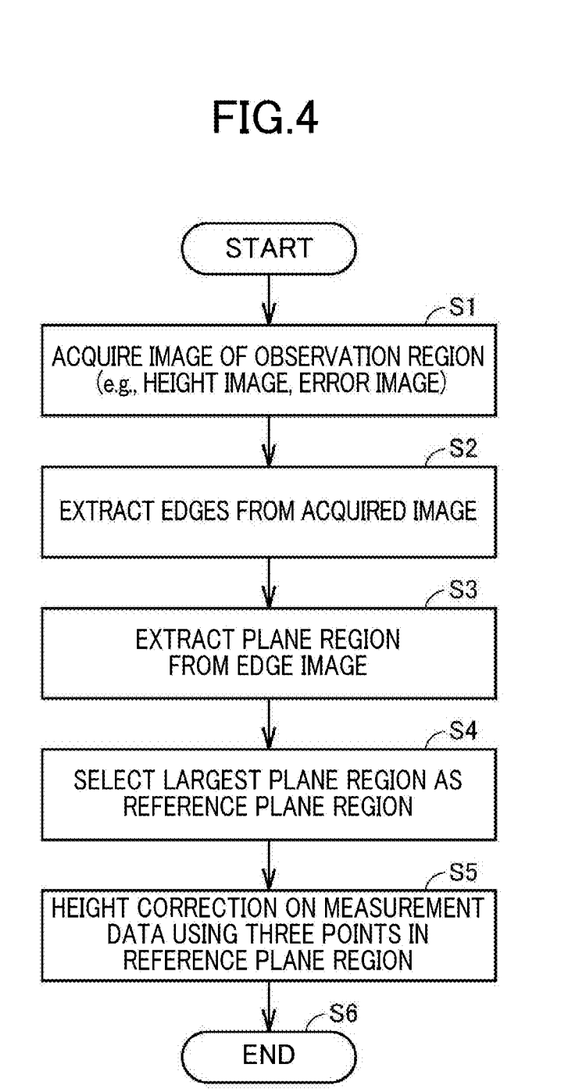
FIG. 4 is a flowchart of a height correction process performed by a computer illustrated in FIG. 1 on measurement data.

FIG. 4 is a flowchart of a height correction process performed by the computer illustrated in FIG. 1 on measurement data. Referring to FIGS. 1 and 4, first, at Step S1, the computer 132 acquires an image of an observation region in the sample 110. With regard to this image, the computer 132 can acquire an image (height image) reproduced from data acquired with the XY scanner 111xy moving the sample stage in the X and Y directions and with the Z scanner 111z scanning the relative position of the probe 114 to the sample stage in the height direction. The image acquired at Step S1 is not limited to a height image, but may be an error image (to be described in a second embodiment) or an image acquired by, for example, a laser microscope attached to the scanning probe microscope 1.

Figure 5:
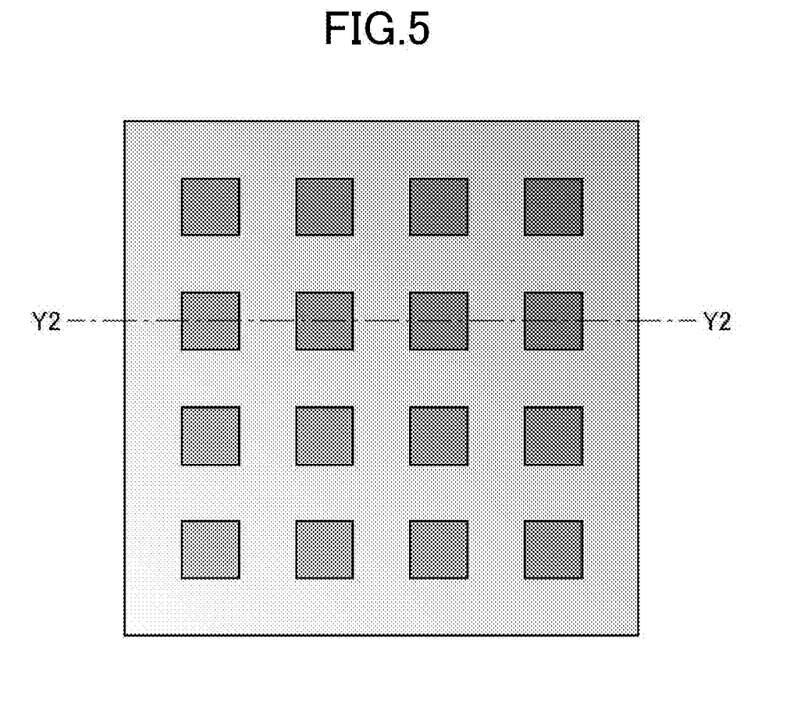
FIG. 5 is a diagram illustrating an example image acquired at Step S1.

FIG. 5 is a diagram illustrating an example image acquired at Step S1. The image illustrated in FIG. 5 includes shading in the same plane since the sample surface is inclined relative to the sample stage.

Figure 6:
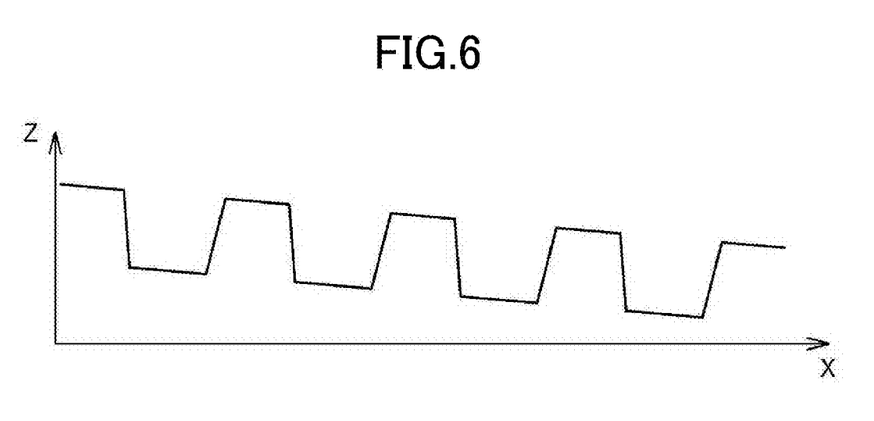
FIG. 6 is a graph illustrating height of a sample taken along line Y2-Y2 in FIG. 5.

FIG. 6 is a graph illustrating height of the sample taken along line Y2-Y2 in FIG. 5. FIG. 6 illustrates image data of one scan line of the sample surface, which is inclined downward as the X coordinate increases. The horizontal axis represents positions in the X direction and the Z-axis represents height at each X position.

If the display unit 135 displays, for example, a perspective view of the sample surface based on the uncorrected data values including inclination of the sample surface, the displayed image of the sample surface represents not only height of the recessed or raised portions on the sample surface but also the inclination, as illustrated in FIG. 5, which makes it difficult to for a user to determine a fine form of the sample surface.

To prevent this situation, the computer 132 in FIG. 1 performs a correction process from Step S2 in FIG. 4 to correct height and then displays an image. Specifically, at Step S2, the computer 132 extracts edges in the image acquired at Step S1.

Figure 7:
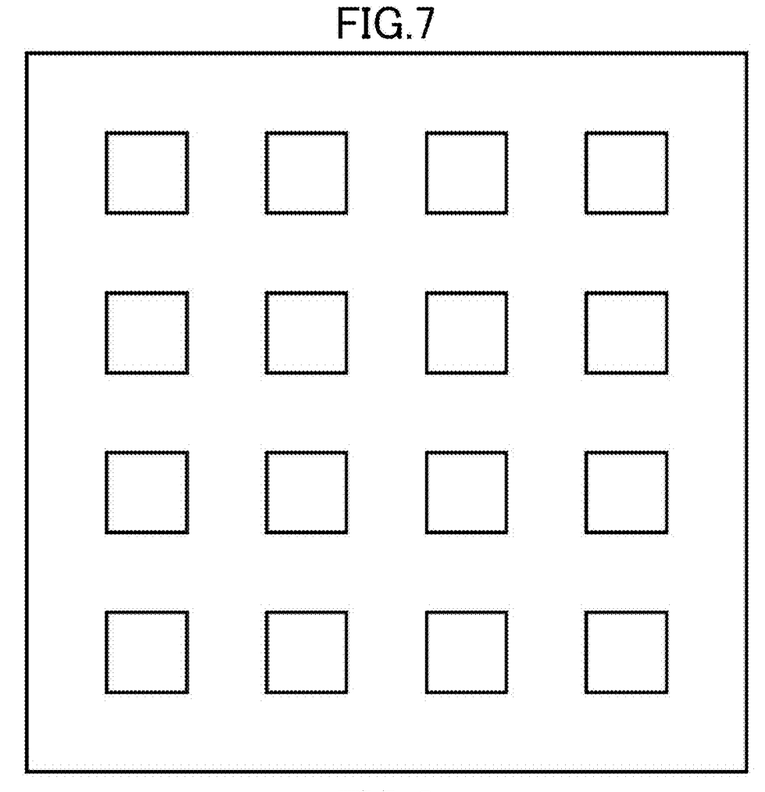
FIG. 7 is a diagram illustrating a state in which the image in FIG. 5 has been processed and edges have been extracted.

FIG. 7 is a diagram illustrating a state in which the image in FIG. 5 has been processed and the edges have been extracted. To extract the edges, the computer 132 can use a typical differential approach to a height image. The computer 132 may use an outline extraction method generally used in, for example, photographic image editing techniques. For example, the computer 132 extracts portions at which an absolute value of a difference between adjacent pieces of pixel data exceeds a certain threshold.

At Step S3, the computer 132 extracts plane regions from an edge image extracted at Step S2.

Figure 8:
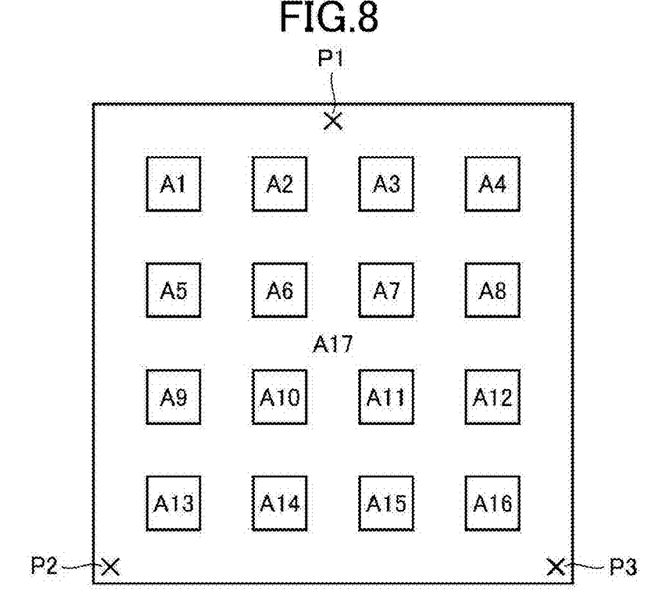
FIG. 8 is a diagram illustrating a state in which plane regions have been extracted.

FIG. 8 is a diagram illustrating a state in which plane regions have been extracted. A portion defined by a closed outline in the edge image is extracted as one plane region. The observation region is consequently divided into regions A1 to A17.

At Step S4, the computer 132 calculates respective areas of the regions A1 to A17 and selects a region having the largest area of the regions as a reference plane region. In FIG. 8, for example, the region A17 is selected as the reference plane region. To select the reference plane region, the computer 132 may use other methods instead of using the method of selecting the largest region. For example, the computer 132 may select a region having the most widely dispersed pixels in the XY-plane as the reference plane region. If, for example, grid lines of a precision grid are thin, this method is effective. If the sample has a predetermined reference plane region, the computer 132 may select a region specified by a shape or a position as the reference plane region. This method can be used for checking micro-fabricated products having a predetermined standard form for observation purposes.

While the image illustrated in FIG. 8 is clearly divided into regions defined by edges and regions not defined by the edges, regions other than edges in an image are not always divided clearly as in FIG. 8. If the computer 132 fails to clearly divide the image, the computer 132, for example, groups heights based on height information of the measurement data, and determines that points having different heights (i.e., points between which a difference in height is greater than a certain value) are not in the same plane. The computer 132 may determine that points having the same height (i.e., points between which a difference in height is smaller than a certain value) are in the same plane, and areas of such planes are summed to select the reference plane region.

At Step S5, the computer 132 performs height correction on the measurement data by using three measurement points in the selected reference plane region. The three points may be selected by any method. For example, if the reference plane region has a rectangular shape as illustrated in FIG. 8, the computer 132 may select the middle point of the upper side and two ends of the lower side as the three points. The selected three points may be located at positions inwardly away from the outer sides by a certain distance. The computer 132 may select three points that are equally away from the center (center of gravity) of the reference plane region. The computer 132 may select three points that defines a triangle having a maximum area in the reference plane region. In one preferred embodiment, the three points are vertices of an equilateral triangle, but may be vertices of an isosceles triangle or any other triangles.

The computer 132 then performs height correction on the measurement data by using the selected three points. A simple example will be described. The horizontal position of each piece of measurement data is represented by an X-axis coordinate and a Y-axis coordinate, and the height thereof is represented by a Z-axis coordinate.

Figure 9:
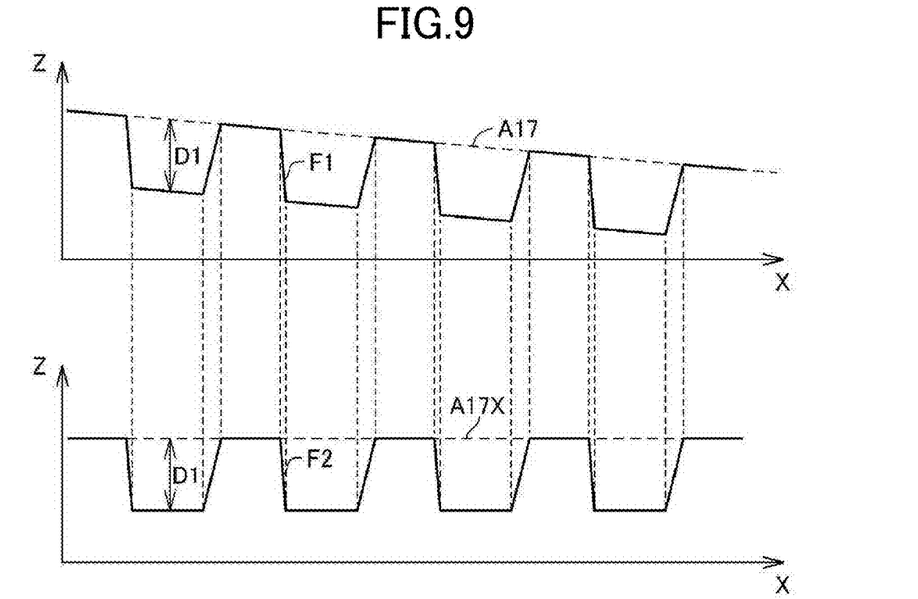
FIG. 9 illustrates graphs for explaining height correction.

FIG. 9 illustrates graphs for explaining height correction. The upper waveform illustrated in FIG. 9 corresponds to a surface form F1 illustrated in FIG. 6 on which a plane A17 is illustrated by a dashed line. The plane A17 is defined by the three points selected from the reference plane region. The lower waveform is created by replotting, with respect to a horizontally plotted plane A17X, a distance D1, which is indicated by a double arrow, in the Z-axis direction between the plane A17 indicated by a dashed line and each measurement point on the inclined surface form F1 in FIG. 6. This process corresponds to height correction performed on the measurement data on the assumption that the selected three points have the same height.

Such a height correction method illustrated in FIG. 9, however, results in a shorter dimension than the actual dimension in the X direction. To perform more accurate height correction, the computer 132 may calculate an inclination angle θ of the plane A17 defined by the three points and rotate the measurement data in the XY-plane about a point in the plane A17 by the inclination angle θ to correct both the Z coordinate and the X coordinate. In this case, in one preferred embodiment, the same process is performed with regard to the Y-axis direction.

Figure 10:
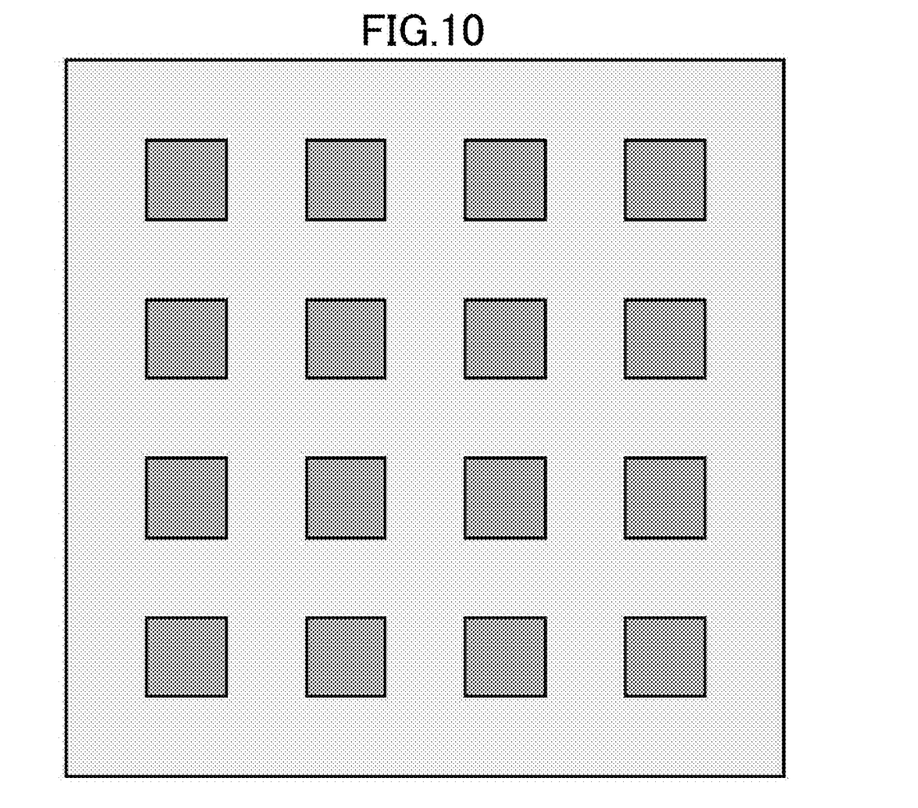
FIG. 10 is a diagram illustrating a display example of an image formed from measurement data after height correction.

Lastly, the computer 132 stores the corrected measurement data in the storage device 134, or generates an image (an image of a three-dimensional object projected on a plane) to be displayed on the display unit 135 by using the corrected measurement data and causes the display unit 135 to display the image. FIG. 10 is a diagram illustrating a display example of an image formed from measurement data after height correction.

Described in the first embodiment is a data correction method for correcting height of a plurality of pieces of measurement data by using image data acquired by the scanning probe microscope 1. This data correction method includes Steps (S2 to S4) of extracting, by the computer 132, the reference plane region A17 illustrated in FIG. 8 from the image data in FIG. 5, and Step (S5) of selecting, by the computer 132, three pieces of measurement data, from the pieces of measurement data, at three points P1 to P3 in the extracted reference plane region as first to third reference point data and correcting, by the computer 132, height of the other pieces of measurement data on the assumption that the first to third reference point data have the same height.

In one preferred embodiment, the horizontal position of the measurement data is represented by an X-axis coordinate and a Y-axis coordinate and the height of the measurement data is represented by a Z-axis coordinate. In Steps (S2 to S4) of extracting the reference plane region, the computer 132 extracts edges based on a difference between a Z-axis coordinate of a pixel of interest and a Z-axis coordinate of a pixel adjacent to the pixel of interest in an XY-plane (S2), and then the computer 132 divides the XY-plane into a plurality of regions based on the extracted edges and extracts a region having the largest area of the regions as the reference plane region (S3 and S4).

The image data according to the first embodiment is data of a height image formed from Z-axis coordinates of the measurement data before correction.

Compared to a method of extracting a reference plane region from an entire observation region on the assumption that the region is a single plane, which in turn extracts a reference plane region generally similar to the observation region, the method according to the first embodiment allows the computer to more accurately correct height of a sample surface having a form, such as a precision grid, with distinct borders between raised or recessed portions and a flat portion, which in turn allows the user to observe the raised or recessed portions at a finer level. Compared to a method of correcting height by causing the user to designate any three points from an image during observation, the method according to the first embodiment eliminates the need for designating the three points, and allows any user to perform height correction substantially equally since the three points are automatically extracted by the computer.

In the first embodiment, the computer 132 corrects height of the measurement data by using selected three measurement points in the reference plane region, but the computer 132 may perform height correction by using four or more measurement points.

Second Embodiment

In the first embodiment above, the image data acquired by the scanning probe microscope 1 for use in extracting a reference plane region is an SPM image (height image). However, other images may be used to extract the reference plane region if the images have image data having a positional relation corresponding to the positional relation of SPM image data.

In a second embodiment of the present disclosure, an error image is used as an example of the other images. An error image is an image that is formed from an error signal Sd output from the feedback signal generator 131 in FIG. 1.

Figure 11:
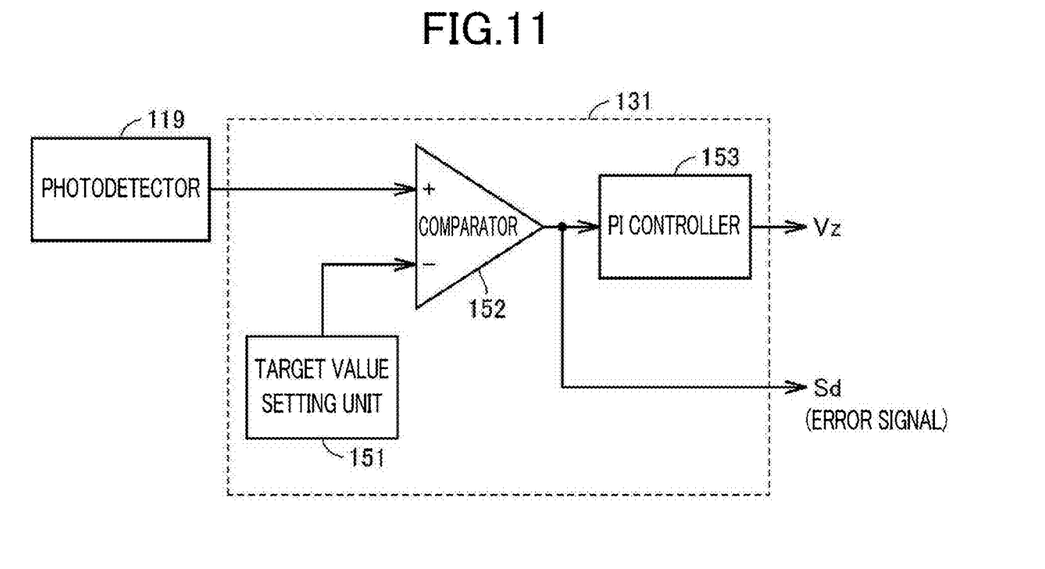
FIG. 11 is a block diagram illustrating an internal configuration of a feedback signal generator 131 in FIG. 1.

FIG. 11 is a block diagram illustrating an internal configuration of the feedback signal generator 131 in FIG. 1. As illustrated in FIG. 11, the feedback signal generator 131 includes a target value setting unit 151, a comparator 152, and a proportional integral (PI) controller 153.

The photodetector 119 is made of, for example, four-segment light detecting electrodes. The photodetector 119 is positioned such that a spot of a laser beam hits the center of the segmented electrodes when the degree of warp of the cantilever 113 is zero. When the cantilever 113 warps, the spot of the laser beam moves on the segmented electrodes, and the voltage output from the segmented electrodes fluctuates. A non-inverting input (+) of the comparator 152 receives the voltage fluctuation as a signal indicating the degree of warp of the cantilever 113. An inverting input (−) of the comparator 152 receives a target value signal relating to the degree of warp of the cantilever 113 from the target value setting unit 151.

An error signal Sd output from the comparator 152 is input to the PI controller 153, where the error signal Sd and its integral value are combined together and the resulting signal is output as a Z scanner control voltage Vz, which also functions as an observed image signal. The control voltage Vz and the error signal Sd are stored in the storage device 134 via the computer 132 in association with X and Y coordinates.

Figure 12:
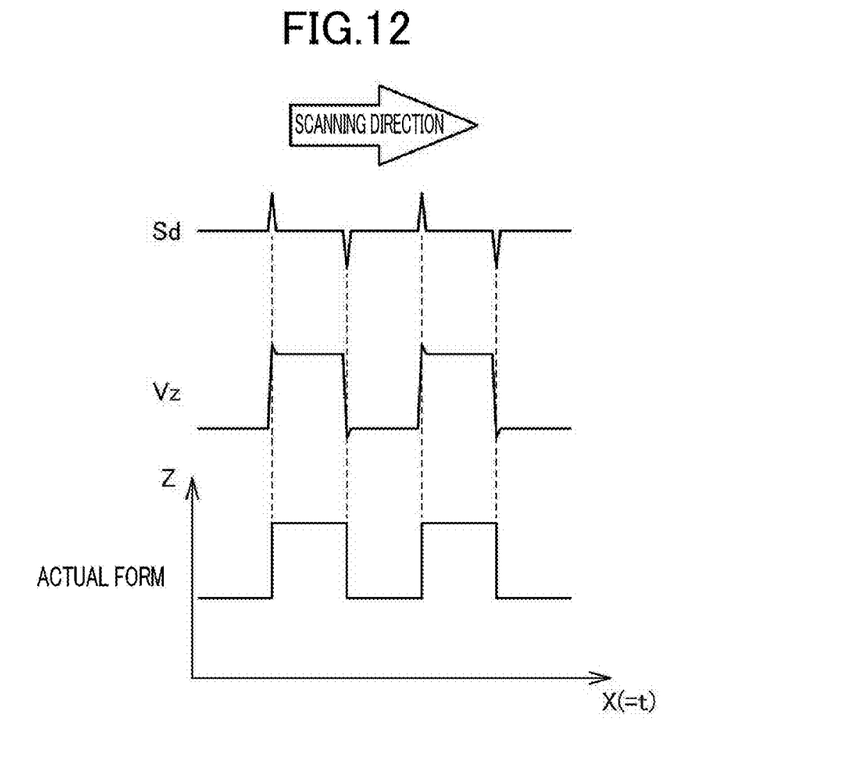
FIG. 12 illustrates graphs illustrating an example relation between an actual form, and a control voltage Vz and an error signal Sd.

FIG. 12 illustrates graphs illustrating an example relation between the actual form, and the control voltage Vz and the error signal Sd.

The degree of warp of the cantilever 113 varies along the raised or recessed portions of the actual form, and the feedback signal generator 131 outputs the control voltage Vz to keep the degree of warp constant. The error signal Sd is generated during the course of this process. As illustrated in FIG. 12, the error signal Sd has a waveform corresponding to a differentiated form of the raised or recessed portions of the actual form. Using the error signal can more easily extract outlines of the actual form than extracting edges by differentiating the SPM image (height image). Therefore, the configuration according to the second embodiment can facilitate the process at Step S2 in FIG. 4.

Described in the second embodiment is a data correction method for correcting height of a plurality of pieces of measurement data by using image data acquired by the scanning probe microscope 1. This data correction method includes Steps (S2 to S4) of extracting, by the computer 132, the reference plane region A17 illustrated in FIG. 8 from the image data in FIG. 5, and Step (S5) of selecting, by the computer 132, three pieces of measurement data, from the pieces of measurement data, at three points P1 to P3 in the extracted reference plane region as first to third reference point data and correcting, by the computer 132, height of the other pieces of measurement data on the assumption that the first to third reference point data have the same height.

In one preferred embodiment, the scanning probe microscope 1 includes the cantilever 113 having the probe 114, the photodetector 119 configured to detect a degree of warp of the cantilever 113, and the feedback signal generator 131. The feedback signal generator 131 performs feedback control on the positional relation between the probe 114 and the sample 110 that is the observation target based on the error signal Sd indicating a difference between the output from the photodetector 119 and the target value set by the target value setting unit 151. In the second embodiment, the image data acquired at Step S1 in FIG. 4 is data of an error image formed from the error signal Sd. The error signal Sd corresponds more to an extracted edge image than to a height image. Using the error signal Sd instead of the height image facilitates the process at Step S2 in which edges of the image are extracted.

The second embodiment has the same effect as the first embodiment, and in addition, can facilitate the process at Step S2 in FIG. 4, which can result in a shorter process time.

A computer program for causing the computer 132 to perform operations (Step S1 to Step S5 in FIG. 4) described in the first and second embodiments may be provided. Such a computer program is recorded and provided as a computer program product in a computer-readable recording medium such as a flexible disk, a compact disc read only memory (CD-ROM), a ROM, a RAM, or a memory card included with a computer. The computer program can be recorded and provided in a recording medium such as a hard disk incorporated in a computer. The computer program can be provided by being downloaded via a network.

The provided computer program product is installed in a program storage unit such as a hard disk and is executed. The computer program product includes a computer program and a storage medium in which the computer program is recorded.

It should be noted that the embodiments disclosed herein are presented by way of example only, and are not intended to limit the scope of the present disclosure. The scope of the present disclosure is defined only by reference to the appended claims, not by the description above, and is intended to encompass the appended claims and their equivalents and all the modifications within the scope of the present disclosure.

What is claimed is:

1. A data correction method for correcting a plurality of pieces of measurement data measured by a scanning probe microscope and each indicating height of an observation target, the data correction method comprising:
   extracting, by a computer, from image data acquired by the scanning probe microscope, pixels each satisfying the condition that a comparison result with an adjacent pixel is an edge as edge pixels;
   extracting, by the computer, a reference plane region by dividing a plane of the image data into a plurality of regions based on the edge and extracting a region having a largest area of the regions as the reference plane region; and
   correcting, by the computer, the height indicated by each piece of measurement data based on height information of the reference plane region.

2. The data correction method of claim 1, wherein
   the correcting includes selecting, from the pieces of measurement data, three pieces of measurement data at three points in the extracted reference plane region as first to third reference point data, and correcting the height of each piece of measurement data on an assumption that the first to third reference point data have a same height.

3. The data correction method of claim 1, wherein
   a horizontal position of each piece of measurement data is represented by an X-axis coordinate and a Y-axis coordinate, and the height indicated by each piece of measurement data is represented by a Z-axis coordinate,
   the extracting the pixels includes extracting the edge based on a difference between a Z-axis coordinate of a pixel of interest and a Z-axis coordinate of a pixel adjacent to the pixel of interest in an XY-plane, and
   the extracting the reference plane region includes dividing the XY-plane into the plurality of regions based on the extracted edge and extracting the region having the largest area of the plurality of regions as the reference plane region.

4. The data correction method of claim 1, wherein
   the correcting includes selecting, from the pieces of measurement data, four or more pieces of measurement data at four or more points in the extracted reference plane region as reference point data, and correcting the height indicated by each piece of measurement data on an assumption that the points selected as the reference point data are in a same XY-plane.

5. The data correction method of claim 1, wherein
   the image data is data of an image that is formed from an error signal.

6. The data correction method of claim 1, wherein
   the correcting includes correcting a Z coordinate of first measurement data of the pieces of measurement data based on a difference, at X and Y coordinates of the first measurement data, between a Z coordinate of a plane defined by first to third reference point data and the Z coordinate of the first measurement data.

7. A computer program product stored on a non-transitory computer readable medium for causing a computer to perform the data correction method of claim 1.

8. An image processor configured to perform the data correction method of claim 1.

9. A scanning probe microscope comprising the image processor of claim 8.

10. A data correction method for correcting a plurality of pieces of measurement data measured by a scanning probe microscope and each indicating height of an observation target, the data correction method comprising:
    extracting, by a computer, an edge from image data acquired by the scanning probe microscope;
    extracting, by the computer, a reference plane region by defining at least part of a region other than the edge in the image data as the reference plane region; and
    correcting, by the computer, the height indicated by each piece of measurement data based on height information of the reference plane region, wherein
    a horizontal position of each piece of measurement data is represented by an X-axis coordinate and a Y-axis coordinate, and the height of each piece of measurement data is represented by a Z-axis coordinate,
    the extracting the edge includes extracting the edge based on a difference between a Z-axis coordinate of a pixel of interest and a Z-axis coordinate of a pixel adjacent to the pixel of interest in an XY-plane, and
    the extracting the reference plane region includes dividing the XY-plane into a plurality of regions based on the extracted edge and extracting a region having a largest area of the regions as the reference plane region.

11. The data correction method of claim 10, wherein
    the correcting includes selecting, from the pieces of measurement data, three pieces of measurement data at three points in the extracted reference plane region as first to third reference point data, and correcting the height of each piece of measurement data on an assumption that the first to third reference point data have a same height.

12. The data correction method of claim 10, wherein
    the correcting includes selecting, from the pieces of measurement data, four or more pieces of measurement data at four or more points in the extracted reference plane region as reference point data, and correcting the height indicated by each piece of measurement data on an assumption that the points selected as the reference point data are in a same XY-plane.

13. The data correction method of claim 10, wherein the image data is data of an image that is formed from an error signal.

14. The data correction method of claim 10, wherein the correcting includes correcting a Z coordinate of first measurement data of the pieces of measurement data based on a difference, at X and Y coordinates of the first measurement data, between a Z coordinate of a plane defined by first to third reference point data and the Z coordinate of the first measurement data.

15. A computer program product stored on a non-transitory computer readable medium for causing a computer to perform the data correction method of claim 10.

16. An image processor configured to perform the data correction method of claim 10.

17. A scanning probe microscope comprising the image processor of claim 16.

* * * * *